May 24, 1938.   L. K. PITMAN   2,118,523
MEDICAL INSTRUMENT
Filed Aug. 8, 1936
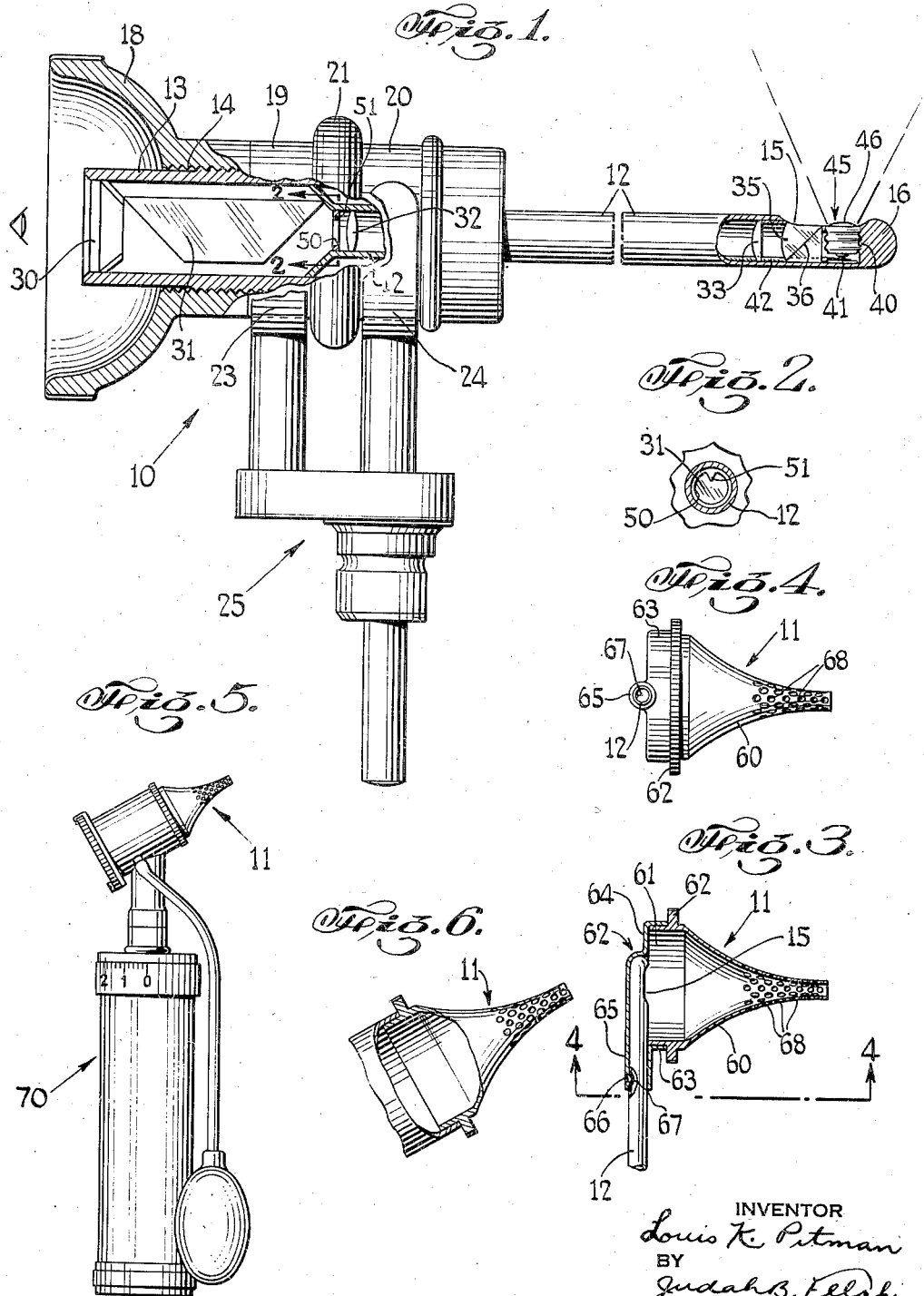
INVENTOR
Louis K. Pitman
BY
Judah B. Felshin
ATTORNEY Patented May 24, 1938

2,118,523

UNITED STATES PATENT OFFICE 2,118,523

MEDICAL INSTRUMENT

Louis K. Pitman, New York, N. Y.

Application August 8, 1936, Serial No. 94,944

12 Claims. (Cl. 128—6)

This invention relates to medical instruments. It is particularly directed to illuminating observation telescopes, such as cystoscopes, nasopharyngoscopes, and the like exploring instruments.

An object of this invention is to provide an instrument of the character described, having an illuminating lamp disposed at right angles to the longitudinal axis of the instrument, whereby to eliminate dead space at the distal end of said instrument, and to bring the lamp and the tip of said instrument closer to the objective.

Another object of this invention is to provide an instrument of the character described, provided with means located within the field of vision and rotatable with the instrument, for indicating the angular position of the fenestral opening, whereby the position of the objective when seen through the instrument is shown to the operator looking into the instrument.

A further object of this invention is to provide an instrument of the character described in combination with a highly improved ear speculum detachably connected thereto and so constructed as to give substantially uniform illumination on the objective.

Yet another object of this invention is to provide a highly improved funnel-shaped speculum, the tip end whereof is perforated to produce substantially uniform lighting on the objective.

A still further object of this invention is to provide a strong, compact and durable instrument of the character described, which shall be relatively inexpensive to manufacture, comprise few and simple parts, which shall be easy to manipulate, and, withal, practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of an instrument embodying the invention, with parts in cross section;

Fig. 2 is a cross-sectional view taken on line 2—2 of Fig. 1;

Fig. 3 is a side view of one end of my improved instrument provided with a speculum made in accordance with my invention;

Fig. 4 is a cross-sectional view taken on line 4—4 of Fig. 3;

Fig. 5 is a side elevational view of an otoscope provided with a speculum embodying the invention; and Fig. 6 is an enlarged side elevational view of a portion of the otoscope, with part of the speculum in cross section.

Referring now in detail to the drawing, 10 designates an illuminating observation telescope embodying the invention, here shown for the purpose of illustration in the form of a nasopharyngoscope or adaptation of a cystoscope, and provided with a removable ear speculum 11, made in accordance with my invention.

The instrument 10 comprises an elongated metal tube or sheath 12, having at one end, an enlarged axial chamber 13 formed with an externally screw-threaded portion 14. Said tube is provided adjacent the outer or distal end thereof with a longitudinal, fenestral opening 15. The end of the tube is closed as at 16. Said closed end 16 may either be removable from or integrally formed with said tube. Screwed to the threaded portion 14 of the tube, is an eye piece 18, made of vulcanized rubber or other similar material. On said tube, furthermore, are a pair of metallic contact rings 19 and 20, insulated from one another and separated by an insulating ridge 21. One of said rings makes electrical contact with the tube 12, while the other is insulated therefrom. Rotatably engaging the contact rings 19 and 20, are a pair of spring clamps 23 and 24, forming part of a jack 25 adapted to be attached to any suitable source of electricity. The jack, contact rings and eye piece form accessories to the instrument and may be of conventional construction.

Within the rear end of the enlarged chamber 13, is a protecting transparent pane 30. Within the chamber is a correcting prism 31. Adjacent the enlarged chamber 13 is a magnifying lens 32. Within the tube 12 and adjacent the fenestral opening 15 is a plano-convex auxiliary lens 33. Within the tube, and at one end of the fenestral opening 15, is an objective lens having an inclined mirrored surface 36. An object within the field of vision is thus seen through the eye piece, the rays passing through the fenestral opening 15 into the objective lens 35 and being reflected by the mirrored diagonal surface 36, and passing through the intermediate lenses within the tube and being magnified by the magnifying lens 32. The image is corrected by the erecting prism 31 and seen through the eye piece as a corrected upright image.

Heretofore, instruments of the general type described herein have been illuminated by lamps usually disposed co-axial of the tube. In accordance with my invention, the space between the end 16 of the tube and the objective lens 35 has therein a small lamp socket 40, preferably of the screw type, making an electric contact with tube 12. The axis of said socket is perpendicular to the axis of the tube and to the plane of the fenestral opening 15. At the bottom of the socket is a central contact 41 insulated from the tube and connected by an insulated wire or conductor 42 to the ring 19 or 20 which is insulated from the tube 12. Screwed within the lamp socket 40 is the threaded base of a small lamp 45 preferably wholly contained within the tube 12 and having an axis likewise perpendicular to the tube 12 and fenestral opening 15. The bulb or glass portion 46 of the lamp lies substantially within the opening 15 and is located adjacent the lens 35. With such construction, the objective lens 35 is brought closer to the end of the instrument. My improved arrangement furthermore eliminates dead space usually found at the distal end of nasopharyngoscopes, or other similar exploring telescopic instruments now in use. Furthermore, the lamp is brought close to the objective to be illuminated, and the tip of the instrument may thus also be brought closer to the objective.

In cystoscopes and nasopharyngoscopes now in use, there is usually provided a marker situated on the rim of the eye piece, and aligned with the fenestral opening to designate the angular position of the latter. I have found that when the threads of the eye piece wear, the marker is often displaced with relation to the fenestral opening. Furthermore, with such construction, it is necessary to locate the position of the marker by sense of touch, thus making for delay in the use of the instrument.

Means is therefore provided to overcome these difficulties. To this end, there is incorporated within the tube, a marker or indicator 50 disposed within the field of vision. The marker may be in the form of a diaphragm or annular ring having an inwardly extending point or tab 51. The diaphragm 50 may be fixed within the tube 12 in any suitable manner with the point 51 aligned with the fenestral opening 15. Said diaphragm is preferably located between the magnifying lens 32 and erecting prism 31. The marker or indicator 50 is thus always fixed within the tube and within the field of vision. As the tube is rotated about its axis, the point 51 always remains in alignment with the opening 15 and the angular position of the latter may therefore be known to the operator looking into the instrument as the same is being rotated.

Although the indicator 50 has been shown as placed between the magnifying lens and correcting prism, it will be understood that the same may be located in any longitudinal part of the tube so as to be within the field of vision. As the operator looks through the instrument, the point 51 is always visible.

When using the instrument to examine an ear there may be detachably mounted on the end of the instrument, the ear speculum 11. The speculum 11 may be of conventional funnel shape, having a substantially conical wall 60 of inwardly curved, longitudinal cross section, and terminating, at the wide end, in a cylindrical mouth 61 and a milled flange 62.

I have found that when light is directed through the usual speculum now in use and shaped similar to the speculum 11 shown in the drawing, the illumination on the objective is not uniform, there resulting spots of increased light density, probably due to reflection of the light rays back and forth on the inner curved, conical surface of the speculum and causing converging of the light rays at certain spots.

Means is therefore provided to obviate this difficulty and for producing a substantially uniform light on the objective through the speculum. To this end, the outer or tip end of the speculum is formed with a plurality of relatively small perforations 68, said perforations being relatively close together and extending substantially half the longitudinal distance from one end of the speculum to the other. I have found that with such construction a substantial uniform illumination of the objective is obtained, the reflection of light within the speculum being reduced by the perforations 68. If desired, the entire curved conical surface of the speculum may be perforated. Furthermore, instead of a plurality of small perforations, the speculum may be formed with a single spiral opening, it being a dominant feature of the invention that the ear speculum be made of one piece, retain substantially its own shape and nevertheless be formed with one or more openings to permit light to escape, whereby reflection within the speculum is substantially reduced.

The mouth portion 61 of the speculum may be frictionally fitted within an adaptor 62. The adaptor has an annular portion 63 to frictionally receive the mouth 61, and a back portion 64 provided with an integral, radial, sleeve extension 64, disposed at right angles to the axis of the speculum and adapted to frictionally receive the outer end of the tube 12. To align the fenestral opening 15 with the longitudinal axis of the speculum, the tube 12 may be provided with a socket 66 adapted to receive a detent 67 at the end of the tubular sleeve 65. When the detent 67 fits within the socket 66, the fenestral opening 15 will be located at the axis of the speculum 11, whereby the objective may be illuminated through the speculum.

In Figs. 5 and 6 there is shown an otoscope 70 of conventional construction and illustrating another use of my improved speculum 11. Said speculum may also be used alone or in conjunction with light from a head mirror.

Although the drawing illustrates the invention as applied to a nasopharyngoscope, it will be understood that the novel features described herein may be incorporated into substantially all forms of illuminating observation telescopes used by members of the medical profession, such as cystoscopes, wherein the lamp is fixed to the sheath and the sheath in turn slides over the lensed portion of the instrument. The invention is also adapted to be incorporated into an illuminating telescopic surgical instrument provided with exploring devices and operating instruments.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An illuminating observation telescope, comprising an elongated tube means for supporting said tube for rotation about its longitudinal axis, said tube having a fenestral opening, adjacent one end, an objective lens at said opening, and means in the tube aligned with said opening located within the field of vision of the telescope for indicating the angular position of the fenestral opening.

2. An illuminating observation telescope, comprising an elongated tube having a fenestral opening, adjacent one end, means for supporting said tube for rotation about its longitudinal axis, an objective lens at said opening, and means located within the field of vision of the telescope for indicating the angular position of the fenestral opening, said means comprising a marker fixed within the tube and offset from the axis thereof, and aligned with said opening.

3. An illuminating observation telescope for surgical use, comprising an elongated tube having a fenestral opening adjacent one end and at one side thereof, an objective lens within the tube at said opening, and a lamp mounted in said tube adjacent said lens, the axis of said lamp being perpendicular to the axis of said tube.

4. A nasopharyngoscope comprising an elongated tube having a fenestral opening, adjacent one end thereof, said end of said tube being closed, a lamp mounted within the tube and adjacent said closed end and disposed on an axis perpendicular to the axis of said tube, and an inwardly extending radial marker within said tube for indicating the annular position of said opening.

5. A cystoscope comprising an elongated tube having an enlarged chamber at one end, an erecting prism within said chamber, means for supporting said tube for rotation about its axis, a magnifying lens within the tube, adjacent said chamber, said tube having a fenestral, longitudinal opening adjacent the distal end thereof, and a pointer within the tube adjacent the inner surface thereof and located between the magnifying lens and the erecting prism to indicate the angular position of said opening.

6. An illuminating observation telescope provided with means to view an object disposed at one side of the instrument, said telescope being rotatable about its longitudinal axis to bring the same to the proper angular position for viewing said object, and means at the inner surface of the telescope which may be seen upon looking into the instrument to indicate the angular position of the object viewed.

7. An illuminating observation telescope provided with means to view an object disposed at one side of the instrument, means for supporting said telescope for rotation about its axis, a marker in the tube, at one side of its axis, and which may be seen upon looking into the instrument to indicate the angular position of the object viewed, and means for illuminating said object, comprising a lamp within the telescope and disposed substantially at right angles to the longitudinal axis of said telescope.

8. An illuminating observation telescope for surgical use, comprising an elongated tube having a fenestral opening, adjacent one end and at one side thereof, an objective lens at said opening, means located within the field of vision of the telescope for indicating the angular position of the fenestral opening, and a lamp within the telescope and adjacent said objective lens, the axis of said lamp being at right angles to the axis of said tube, and the bulb portion of said lamp being located at said fenestral opening.

9. In combination with a telescope, an annular member fixed within said telescope and having an inwardly projecting tab located within the field of vision of said telescope.

10. An illuminating observation telescope comprising an elongated tube having a fenestral opening, an objective lens adjacent said opening having an inclined mirrored surface, an inwardly projecting, radial tab, in said telescope aligned with said fenestral opening, a screw-threaded lamp socket within said tube and adjacent said objective lens, the axis of said lamp socket being disposed at right angles to the axis of said tube, and a screw-threaded lamp within said socket.

11. An illuminating observation telescope for surgical use, provided with means to view an object disposed at one side of the instrument, and means for illuminating said object, comprising a lamp screwed within said telescope adjacent one end thereof and disposed substantially at right angles to the longitudinal axis of said telescope.

12. A funnel-shaped ear speculum having a conical wall of inwardly curved longitudinal cross section, said curved wall being formed with a plurality of closely spaced small perforations.

LOUIS K. PITMAN.